United States Patent
Sokolihs et al.

(10) Patent No.: US 6,308,959 B1
(45) Date of Patent: Oct. 30, 2001

(54) ELASTIC SEALING ELEMENT IN THE FORM OF BELLOWS

(75) Inventors: Dirk Sokolihs, Bramsche; Uwe Petersen, Espelkamp, both of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/254,263

(22) PCT Filed: Jun. 19, 1998

(86) PCT No.: PCT/DE98/01695

§ 371 Date: Mar. 1, 1999

§ 102(e) Date: Mar. 1, 1999

(87) PCT Pub. No.: WO99/00617

PCT Pub. Date: Jan. 7, 1999

(30) Foreign Application Priority Data

Jun. 27, 1997 (DE) .............................. 197 27 494

(51) Int. Cl.$^7$ ........................................ F16J 15/38
(52) U.S. Cl. ................ 277/394; 277/552; 277/634; 403/51
(58) Field of Search ...................... 277/391, 394, 277/389, 549, 552, 634, 635; 403/50, 51; 464/173, 175

(56) References Cited

U.S. PATENT DOCUMENTS 3,208,290 * 9/1965 Mathues et al. ................ 403/51 X
3,248,955 * 5/1966 Templeton ................... 277/635 X
5,568,930 * 10/1996 Urbach ........................ 277/635

FOREIGN PATENT DOCUMENTS 196 34 444 A1 2/1997 (DE) .

* cited by examiner

*Primary Examiner*—Robert J. Sandy
*Assistant Examiner*—Karlena D. Schwing
(74) *Attorney, Agent, or Firm*—McGlew and Tuttle, P.C.

(57) ABSTRACT

An elastic sealing element in the form of bellows, which is used to seal the contact surface between at least two components movable in relation to one another is described, which has low-elasticity contact zones as well as a deformation zone whose elasticity is higher than that of the contact zones, wherein the said deformation zone defines a chamber for accommodating lubricants on its inner side facing the movable components. An overpressure relief means (14) is arranged at least in the area of one of the two low-elasticity contact zones (6 or 7). The overpressure relief means (14) has at least one relief opening (15) connecting the lubricant chamber (11) with the outside of the sealing element (1) and a closing element (16) covering the said relief opening. The closing element (16) is in turn made in one piece with the sealing element (1) and closes the relief opening (15) up to an overpressure limit in the lubricant chamber (11) due to the intrinsic elasticity of the material of the sealing element.

15 Claims, 6 Drawing Sheets

I-SLOT

5:1

5:1

X-SLOT

ELASTIC SEALING ELEMENT IN THE FORM OF BELLOWS

FIELD OF THE INVENTION

The present invention pertains to an elastic sealing element in the form of bellows for sealing the contact surface between at least two components movable in relation to one another with low-elasticity contact zones on the movable components, with a deformation zone of an elasticity higher than that of the contact zones, which is located between the contact zones and defines a chamber for accommodating lubricants on its inner side facing the movable components, and with an overpressure relief device.

BACKGROUND OF THE INVENTION

Sealing elements of this type have been known from, e.g., DE 196 34 444 A1 and are used in many areas of mechanical engineering, e.g., in automotive engineering. The above-mentioned document discloses a ball connection arrangement, in which an overpressure relief device is present, which is designed in the manner of a valve. An opening in an elastic sealing element, which opening connects the interior of a lubricant chamber to the outside air, is covered by a retaining ring here. If the pressure inside the lubricant chamber rises above a predetermined value as a consequence of a rise in the temperature of the lubricant, the pressing forces of the retaining ring are no longer sufficient to close the connection opening of the sealing element, so that lubricant can escape between the retaining ring and the sealing element at a corresponding overpressure.

The design of the overpressure relief structure disclosed in the document cited is disadvantageous because the retaining ring needed to seal the relief opening is displaceable in relation to the sealing element and also must be made as a slotted ring for reasons of mounting. Due to these properties dictated by the design, it may happen that the slot of the retaining ring is positioned exactly over the opening for relieving the overpressure. The consequence of this is that lubricant can escape unhindered to the outside even under normal pressure in the lubricant chamber or there is a possibility that contaminants can enter the lubricant chamber from the outside. Moreover, such retaining rings tend to fatigue or to have their function reduced at least partially, e.g., due to corrosion.

SUMMARY AND OBJECTS OF THE INVENTION

The primary object of the present invention is to provide an elastic sealing element that guarantees reliable sealing at any time and under all operating conditions and has, moreover, an overpressure relief means that operates reliably at any time, can be manufactured easily and at a low cost and offers safety against errors in mounting.

This object is accomplished according to the present invention by the overpressure relief structure being arranged in the area of one of the low-elasticity contact zones, by which the sealing element is in contact with the components to be sealed, which are movable in relation to one another, and by having at least one relief opening connecting the lubricant chamber to the outside of the sealing element and a closing element covering this relief opening; wherein the closing element is made in one piece with the sealing element and wherein the closing element closes the relief opening up to an overpressure limit in the lubricant chamber due to the intrinsic elasticity of the material of the sealing element.

The one-piece design of the closing element with the sealing element reliably prevents any error in mounting as they may occur in the case of the design according to the above-mentioned document, because additional components of the overpressure relief means of the sealing element are not present. Moreover, the one-piece design can be manufactured simply and at a low cost.

The relief opening may be designed as circular slots, wherein the depth of the slots is essentially half the wall thickness of the sealing element in the area in which the overpressure relief structure is arranged. The lubricant chamber may be connected to the slot by at least one hole. A plurality of the holes, which connect the lubricant chamber with the slot may be arranged on at least one concentric radius.

The relief opening may be designed as a slot. This slot is arranged in a partial area of the circumference of the sealing element and connects the lubricant chamber directly to the outside of the sealing element. A plurality of slots may be arranged as relief openings over the circumference of the sealing element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
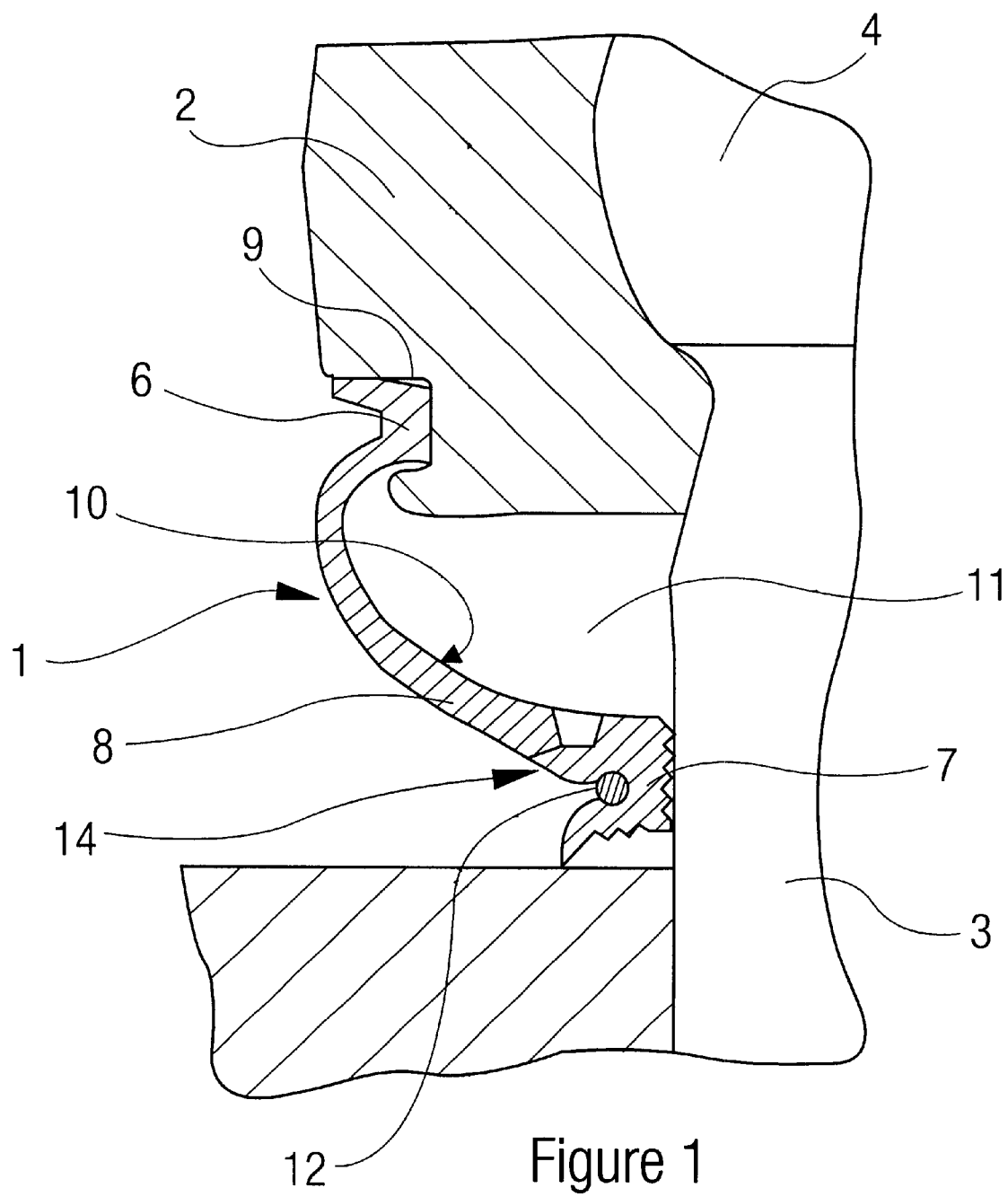
FIG. 1 is a simplified sectional view of the elastic sealing element according to the present invention.

Referring to the drawings in particular, the sealing element according to the present invention, designated by the reference number 1, is used to seal the contact surface of two components 2 and 3 in the exemplary embodiment shown. Component is the socket of a ball and socket joint, into which the joint ball 4 of the component 3, which is the link rod of a ban pivot in this case, is inserted. The sealing element 1 has a contact zone 6 with the socket 2 of the ball and socket joint and a contact zone 7 at the link rod 3. The contact zones 6 and 7 have a saw-tooth or jagged pattern on their connection surface with the components 2 and 3 in the sectional view, so that a labyrinth seal is obtained. A deformation zone 8, which, as is apparent from FIG. 1, has a thinner cross section than the contact zones 6 and 7, extends between the contact zones 6 and 7 of the sealing element 1. This design, in conjunction with the bulged shape of the deformation zone 8, brings about a high elasticity of this zone, so that the deformation of the sealing element 1 takes place in this area during relative movements between the link rod 3 and the socket 2 of the ball and socket joint. The contact zone 6 is arranged in a groove 9 in this exemplary embodiment, so that an axial displacement in the direction of the longitudinal axis of the link rod 3 is ruled out A locking ring 12 is arranged on the outside of the contact zone 7 on the outside at the sealing element 1 in order to increase the pressing forces within the contact zone 7 on the link rod 3.

An overpressure relief means (overpressure relief device) 14 is located in the contact zone 7 adjacent to the locking ring 12. This overpressure relief means 14 is used to relieve an overpressure building up within the lubricant chamber 11 defined by the deformation zone 8 to the outside in a controlled manner.

Figure 2:
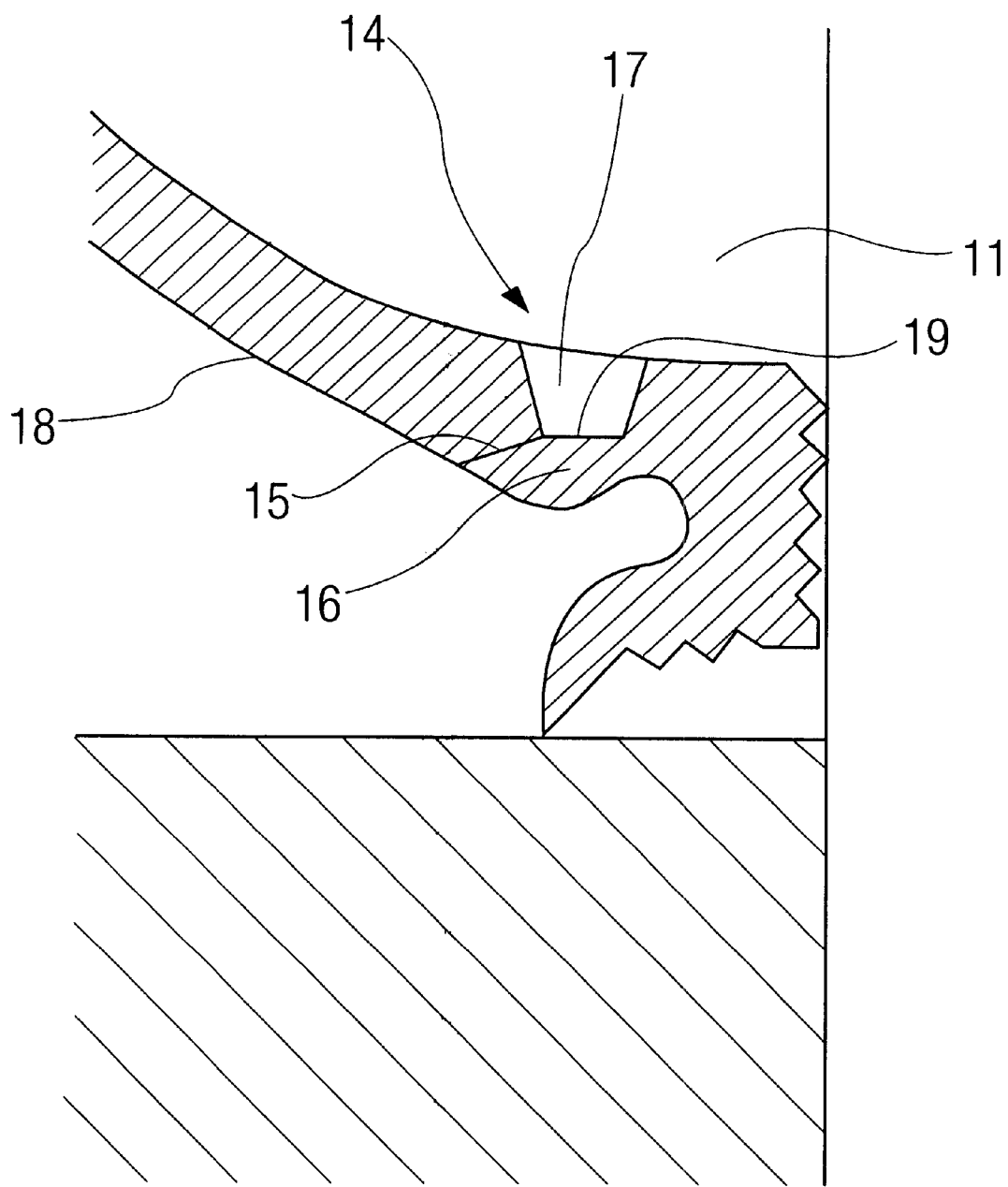
FIG. 2 is an enlarged representation of the sealing element from FIG. 1 in the area of the overpressure relief structure.

FIG. 2 shows the overpressure relief means 14 for illustration on a larger scale. In the exemplary embodiment shown, the overpressure relief means 14 comprises a relief opening 15 designed as a slot, a connection hole 17, which is open toward the inside of the sealing element, i.e., toward the lubricant chamber 11, as well as a closing element 16, which is designed as a sealing lip. The slot 15, which forms the relief opening, extends at an oblique angle to the outer surface 18 of the sealing element and is arranged circularly. The sealing lip 16, which forms the closing element, is made integrally in one piece with the sealing element, as is clearly apparent from FIGS. 1 and 2. The sealing element 1 consists of an elastomeric material, e.g., a rubber blend. The arrangement of the slot 15 ensures that the intrinsic elasticity of the elastomeric material will cause the slot 15 to close the sealing lip 16. If the operating conditions of the overall arrangement cause the lubricant temperature and consequently the pressure within the lubricant chamber 11 to rise, the increase in pressure causes lubricant to penetrate into the hole 17 and to be pressed against the base 19 of the hole. If the overpressure exceeds a certain limit value, the sealing lip 16 is pressed outward in the area of the hole 17, so that lubricant can escape to the outside through the slot 15, as a result of which the overpressure within the lubricant chamber 11 is eliminated. The elastic restoring forces of the sealing lip cause an automatic reclose of the slot 15 after the elimination of the overpressure, so that the penetration of contaminants into the lubricant chamber is ruled out reliably. The setting of the so-called overpressure limit, i.e., the pressure that leads to an opening of the slot, may make it necessary to arrange a plurality of holes 17 concentrically on the circumference of the sealing element.

Another variant of the overpressure relief means according to the present invention may be designed such that, e.g., the relief opening 15 is designed as an obliquely extending slot in a certain partial circumferential area of the sealing element 1, wherein the slot reaches from the outside of the sealing element 1 directly into the lubricant chamber 11. A connection hole 17 as in the above-described example may be omitted in this case. It is, of course, also conceivable to arrange a plurality of short slot- or groove-like relief openings 15 on the circumference of the sealing element 1 in order to make it possible to eliminate a high overpressure correspondingly rapidly.

Figures 3A, 3B:
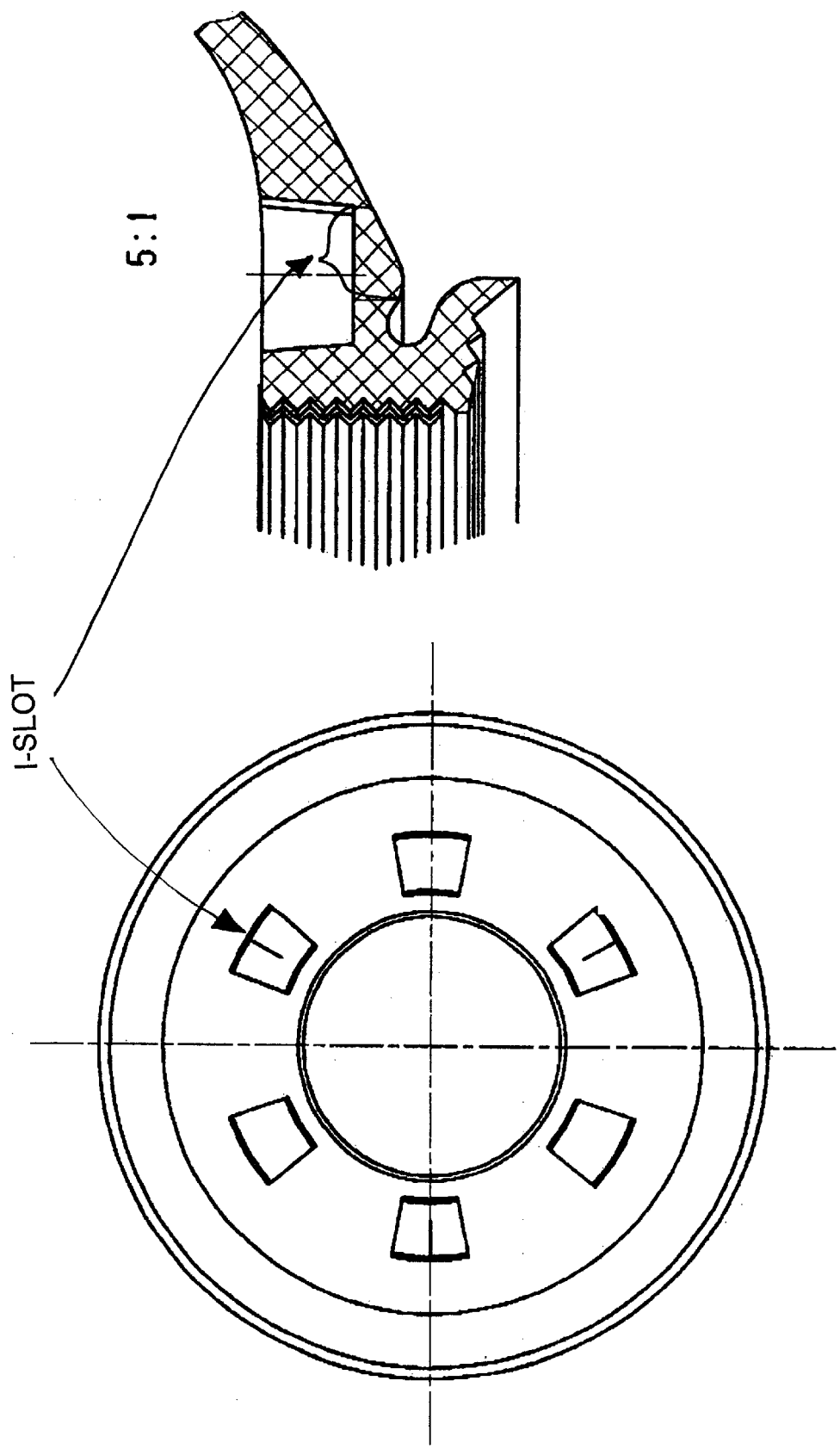
FIG. 3A is a top view showing the embodiment of a slot (I-shaped)
FIG. 3B is a partially cut-away cross-sectional view of the embodiment of FIG. 3A.
Figure 4B:
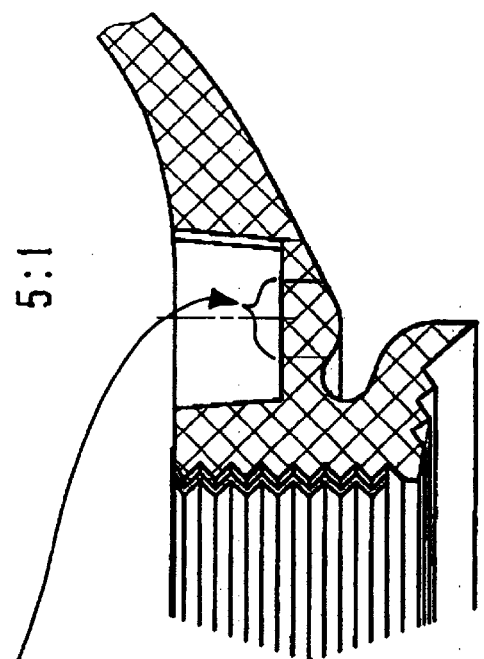
FIG. 4B is a partially cut-away cross-sectional view of the embodiment of FIG. 4B.
Figure 4A:
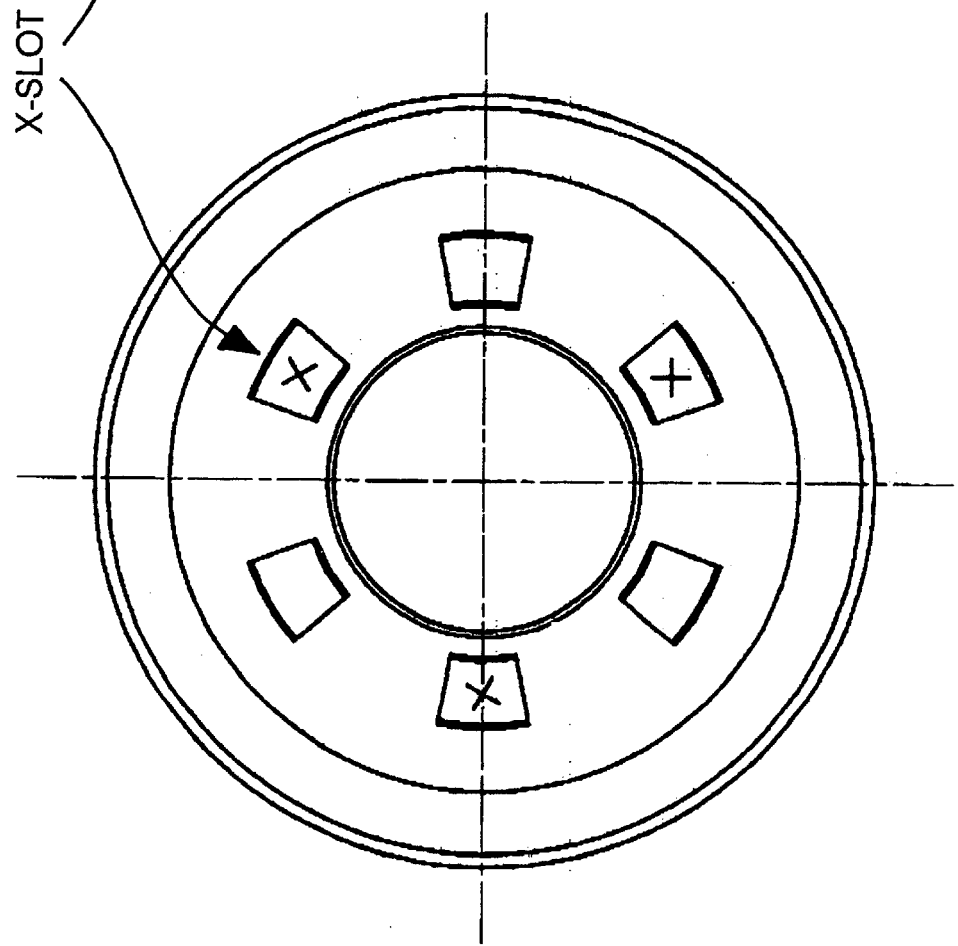
FIG. 4A is a top view showing the embodiment of a slot (X-shaped)
Figure 5B:
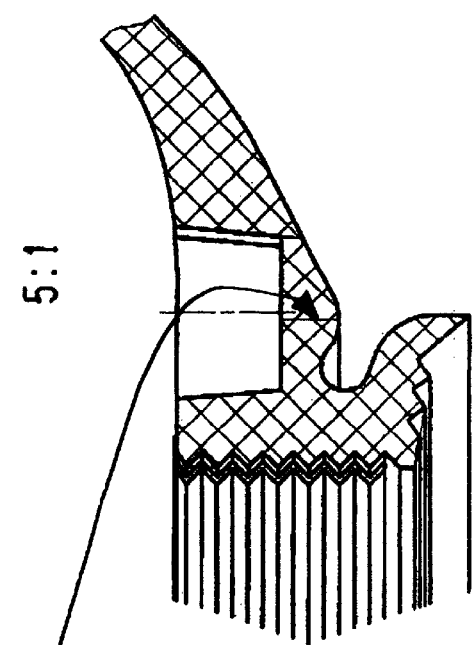
FIG. 5B is a partially cut-away cross-sectional view of the embodiment of FIG. 5A.
Figure 5A:
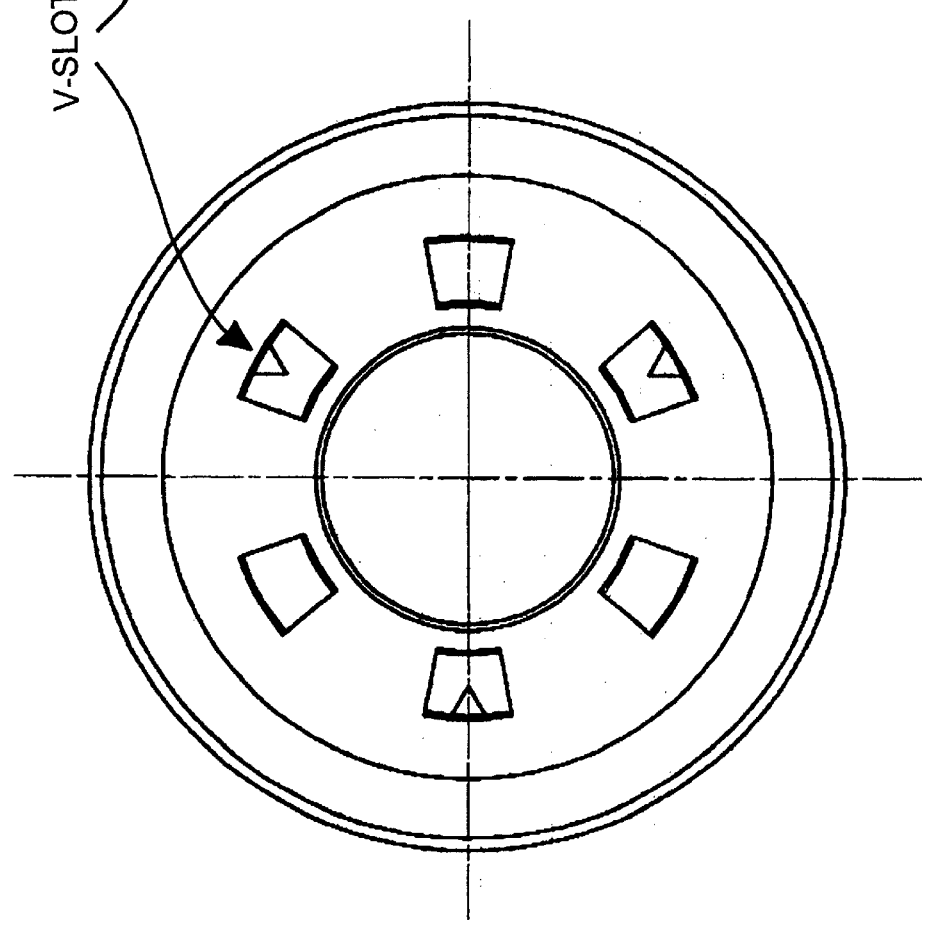
FIG. 5A is a top view showing the embodiment of a slot (V-shaped)
Figure 6B:
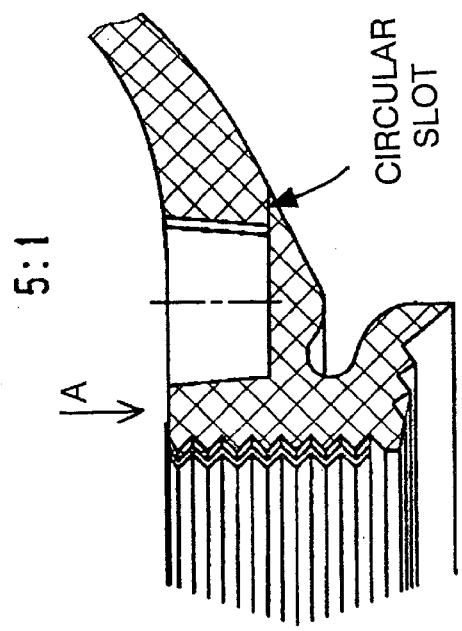
FIG. 6B is a partially cut-away cross-section view of the embodiment of FIG. 6A.
Figure 6A:
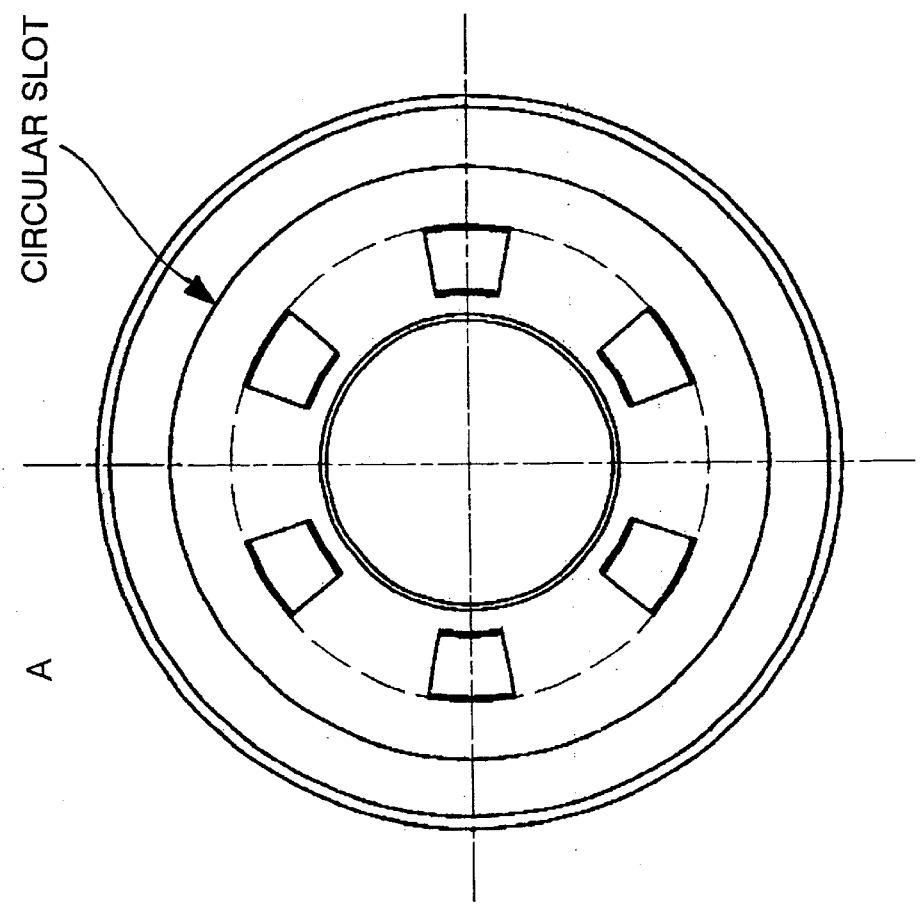
FIG. 6A is a top view showing the embodiment of a slot at an edge.

The embodiments of the invention are shown in FIGS. 3A–6B. FIGS. 3A and 3B show an embodiment with an I-shaped slot. FIGS. 4A and 4B shown an embodiment with an X-shaped slot FIGS. 5A and SB show an embodiment with a V-shaped slot. FIGS. 6A and 6B show an embodiment with a circular slot connected to each of the connection holes 17.

While specific embodiments of the invention have been shown and described in detail to illustrate the application of the principles of the invention, it will be understood that the invention may be embodied otherwise without departing from such principles.

What is claimed is:

1. An elastic sealing element in the form of bellows for sealing the contact surface between at least two components movable in relation to one another, the sealing element comprising;

low-elasticity contact zones with contact surfaces for contact with the movable components;

a deformation zone of an elasticity higher than that of said contact zones, said deformation zone being located between the contact zones and defining a chamber space for accommodating lubricants on an inner side facing the movable components and having an outer surface;

an overpressure relief device arranged in an area of one of said low-elasticity contact zones and having at least one relief opening connecting said lubricant chamber to the outside of said sealing element and a closing element having a closed position closing said relief opening, wherein sad closing element is made in one piece with said sealing element and closes said relief opening up to an overpressure limit in said lubricant chamber due to an intrinsic elasticity of the material of the sealing element, said closing element being substantially flush with said outer surface in said closing position.

2. An elastic sealing element in accordance with claim 1, wherein said relief opening includes a circular slot wherein the depth of said slot is essentially half the wall thickness of the sealing element in said area in which said overpressure relief device is arranged, and said lubricant chamber is provided in communication with said slot by a hole.

3. The elastic sealing element in accordance with claim 2, further comprising additional holes which connect said lubricant chamber with said slot, said additional holes being arranged on at least one concentric radius.

4. The elastic sealing element in accordance with claim 1, wherein said relief opening is designed as a slot, which is arranged in a partial area of a circumference of said sealing element and connects said lubricant chamber directly to an outside of said sealing element.

5. An elastic sealing element in accordance with claim 4, wherein a plurality of said are arranged as relief openings over the circumference of said sealing element.

6. The elastic sealing element in accordance with claim 1, wherein an amount of compression of an adjacent on of said contact zones sets a contact pressure between said closing element and said relief opening to set said overpressure limit.

7. An elastic sealing element in combination with two components movable in relation to one another, the combination comprising:

a first element;

a second element movable relative to the fist component;

a first low-elasticity contact zone in contact with the first component;

a second low-elasticity contact zone in contact with the second component;

a deformation zone located between said first contact zone and said second contact zone and defining a chamber for accommodating lubricants on an inner side facing the first component and second component, said deformation zone having an elasticity higher than that of said first contact zone and said second contact zone, said deformation zone having an outer surface; and an overpressure relief means arranged in an area of one of said first contact zone and said second contact zone, said overpressure means having at least one relief opening connecting said lubricant chamber to the outside of said sealing element and extending at an oblique angle with respect to said outer surface and a closing element closing said relief opening, wherein said dosing element is made in one piece with said sealing element and closes said relief opening up to an overpressure limit in said lubricant chamber due to an intrinsic elasticity of the material of the sealing element.

8. The combination in accordance with claim 7, wherein said relief opening includes a circular slot, wherein the depth of said slot is essentially half the wall thickness of the sealing element in said area in which said overpressure relief device is arranged, and said lubricant chamber is provided in communication with said slot by a hole.

9. The combination in accordance with claim 8, further comprising additional holes which connect said lubricant chamber with said slot, said additional holes being arranged on at least one concentric radius.

10. The combination in accordance with claim 7, wherein said relief opening is designed as a slot, which is arranged in a partial area of a circumference of said sealing element and connects said lubricant chamber directly to an outside of said sealing element.

11. The combination in accordance with claim 10, wherein a plurality of said slots are arranged as relief openings over the circumference of said sealing element.

12. A combination in accordance with claim 7, wherein said closing element is substantially flush with said outer surface.

13. A combination in accordance with claim 7, wherein an amount of compression of an adjacent on of said contact zones sets a contact pressure between said closing element and said relief opening to set said overpressure limit.

14. An elastic sealing element in combination with two components movable in relation to one another, the combination comprising:

a first element;

a second element movable relative to the first component;

a first low-elasticity contact zone in contact with the first component;

a second low-elasticity contact zone in contact with the second component;

a deformation zone located between said first contact zone and said second contact zone and defining a chamber for accommodating lubricants on an inner side facing the first component and second component, sad deformation zone having an elasticity higher than that of said first contact zone and said second contact zone, said deformation zone having an outer surface; and an overpressure relief means arranged in an area of one of said first contact zone and said second contact zone, said overpressure means having at least one relief opening connecting said lubricant chamber to the outside of said sealing element and a closing element closing said relief opening, wherein said closing element is made in one piece with said sealing element and closes said relief opening up to an overpressure limit in said lubricant chamber due to an intrinsic elasticity ofthe material ofthe sealing element, said relief opening comprising a circular slot, wherein the depth of said slot is essentially half the wall thickness of the sealing element in said area in which said overpressure relief device is arranged, and said lubricant chamber is provided in communication with said slot by a hole.

15. An elastic sealing element in the form of bellows for sealing the contact surface between at least two components movable in relation to one another, the sealing element comprising;

low-elasticity contact zones with contact surfaces for contact with the movable components;

a deformation zone of an elasticity higher than that of said contact zones, said deformation zone being located between the contact zones and defining a chamber space for accommodating lubricants on an inner side facing the movable components; and an overpressure relief device arranged in an area of one of said low-elasticity contact zones and having at least one relief opening connecting said lubricant chamber to the outside of said sealing element and a closing element closing said relief opening, wherein said closing element is made in one piece with said sealing element and closes said relief opening up to an overpressure limit in said lubricant chamber due to an intrinsic elasticity of the material of the sealing element, said relief opening including a circular slot, wherein the depth of said slot is essentially half the wall thickness ofthe sealing element in said area in which said overpressure relief device is arranged, and said lubricant chamber is provided in communication with said slot by a hole and further comprising additional holes which connect said lubricant chamber with said slot, said additional holes being arranged on at least one concentric radius.

* * * * *